Patented June 30, 1936

2,046,037

UNITED STATES PATENT OFFICE 2,046,037

METHOD OF COATING FERROUS BODIES WITH OTHER METALS

Anselmo Ortiz Rodriguez, Valverde-Leganes, Spain

No Drawing. Application May 18, 1935, Serial No. 22,267. In Poland June 14, 1934

8 Claims. (Cl. 148—14)

In my copending application Serial No. 707,290, filed January 19, 1934, I have disclosed a process of eliminating the carbon from the surface of ferrous bodies which are to be coated with a non-ferrous metal. In this process the ferrous bodies, prior to the application of the metal, are passed through an atmosphere of a decarburizing agent at a relatively high temperature. Ammonium chloride is designated as a particularly advantageous decarburizing agent.

The ammonium chloride vapor, notwithstanding its efficient decarburizing action on the ferrous bodies, is somewhat inconvenient to use, inasmuch as it necessitates the employment of a relatively high temperature during the decarburizing operation. In some cases this gives rise to attacks upon the metal and causes secondary chemical reactions which are difficult to avoid and which impair somewhat the efficiency of the process. In addition, in the process disclosed in my prior application, the ammonium chloride is introduced into the decarburizing apparatus in a solid state which requires a careful hand operation and is, therefore, relatively expensive.

I have now discovered a process of decarburizing the surface of ferrous bodies by means of which better working conditions may be employed, for example, lower temperatures and greater speeds, without any of the aforementioned disadvantages.

My new process utilizes certain chemical compounds, such as oxyhalides, oxyhalogenhydrates, and oxysalts of certain metals, for example, zinc and cadmium, which have the property of oxidizing carbon at temperatures approaching, but below, red heat, (900° F.) in order to transform the carbon on the ferrous bodies to carbon monoxide or carbon dioxide without oxidizing the iron base. Examples of compounds of this general class are $ZnCl_2.ZnO$ and $Cd(OH)_2.CdCl_2$.

In practicing my new process of decarburizing the surface of ferrous bodies, various mechanical arrangements may be employed for producing these chemical compounds in a treating zone maintained at the appropriate temperature through which the ferrous body to be decarburized is placed or passed. Alternatively the chemical compounds may be produced outside of this zone and introduced into the same by any suitable arrangement.

As illustrative of my invention, excellent results may be obtained by employing aqueous solutions of zinc or cadmium halides, for example, $ZnCl_2$ and $CdCl_2$. If an iron wire, for example, is to be decarburized prior to being coated with metal, the wire may be wetted by an aqueous solution of the zinc or cadmium halide so that it will be covered with a thin and uniform film of the aqueous solution of the halide and then passed through a zone maintained at a temperature approximating but below red heat. The water in the solution will react with the halide to form the oxyhalide.

For example, if an aqueous solution of zinc chloride is employed, this will react as follows:

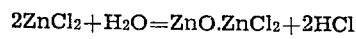

$$2ZnCl_2 + H_2O = ZnO.ZnCl_2 + 2HCl$$

The zinc oxychloride that is formed remains adherent on the ferrous body at first in a solid state and then passes through a liquid state and finally to a vaporous state due to the temperature of the treating zone. In the vaporous state the zinc oxychloride oxidizes the carbon present on the surface of the ferrous body according to the following reaction:

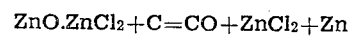

$$ZnO.ZnCl_2 + C = CO + ZnCl_2 + Zn$$

It will be noted that during the treatment hydrochloric acid is formed. This reacts with any iron oxide on the surface of the ferrous body to form chlorides and water which are eliminated from the reaction zone in a vaporous state. The process, therefore, deoxidizes as well as decarburizes the surface.

Instead of zinc chloride, which is given only as an example, other halides, oxyhalides, oxysalts or mixtures thereof may be used, and all of these compounds will react in the same manner.

If a halide of cadmium is employed, for example, cadmium chloride, cadmium oxychlorhydrate $Cd(OH)_2.CdCl_2$ will be formed as the intermediate reaction product. The entire process can be combined into a single equation as follows:

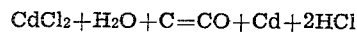

$$CdCl_2 + H_2O + C = CO + Cd + 2HCl$$

It will be obvious that there are many compounds falling within the general class which I have disclosed all of which will operate in a suitable manner. It will also be obvious that various mechanical arrangements may be devised for employing my process in treating ferrous bodies of various shapes and sizes. I intend all such modifications and variations to be included within the scope of my invention as defined in the following claims:

I claim:

1. In a method of coating ferrous bodies with non-ferrous metals, the step of decarburizing and deoxidizing the surface of said ferrous bodies prior to the coating, which comprises subjecting the ferrous bodies to an atmosphere of a compound selected from the group consisting of the oxyhalides, oxyhalogenhydrates, and oxysalts of zinc and cadmium, said atmosphere being maintained at a temperature such that the carbon present on the ferrous bodies is transformed into carbon oxides and other impurities on the surface of the ferrous bodies are eliminated in a gaseous state, without oxidizing the ferrous bodies.

2. In a method of coating ferrous bodies with non-ferrous metals, the step of decarburizing and deoxidizing the surface of said ferrous bodies prior to the coating, which comprises subjecting the ferrous bodies to an atmosphere of a material selected from the group consisting of the halides, oxyhalides, oxyhalogenhydrates, oxysalts of zinc and cadmium and mixtures thereof, said atmosphere being maintained at a temperature such that the carbon present on the ferrous bodies is transformed into carbon oxides and other impurities on the surface of the ferrous bodies are eliminated in a gaseous state, without oxidizing the ferrous bodies.

3. In a method of coating ferrous bodies with non-ferrous metals, the step of decarburizing and deoxidizing the surface of said ferrous bodies prior to the coating, which comprises subjecting the ferrous bodies to an atmosphere of zinc oxychloride, said atmosphere being maintained at a temperature such that the carbon present on the ferrous bodies is transformed into carbon oxides and other impurities on the surface of the ferrous bodies are eliminated in a gaseous state, without oxidizing the ferrous bodies.

4. In a method of coating ferrous bodies with non-ferrous metals, the step of decarburizing and deoxidizing the surface of said ferrous bodies prior to the coating, which comprises subjecting the ferrous bodies to an atmosphere of cadmium oxychlorhydrate, said atmosphere being maintained at a temperature such that the carbon present on the ferrous bodies is transformed into carbon oxides and other impurities on the surface of the ferrous bodies are eliminated in a gaseous state, without oxidizing the ferrous bodies.

5. In a method of coating ferrous bodies with non-ferrous metals, the step of forming an atmosphere of a compound selected from the group consisting of oxyhalides, oxyhalogenhydrates, and oxysalts of zinc and cadmium, by reacting in situ with water a compound selected from the group consisting of the halides of zinc and cadmium, and subjecting the ferrous bodies to said atmosphere which is maintained at a temperature such that the carbon present on the ferrous bodies is transformed into carbon oxides and other impurities on the surface of the ferrous bodies are eliminated in a gaseous state, without oxidizing the ferrous bodies.

6. In a method of coating ferrous bodies with non-ferrous metals, the step of decarburizing and deoxidizing the surface of said ferrous bodies prior to the coating, which comprises coating said ferrous bodies with an aqueous solution of a compound selected from the group consisting of the halides of zinc and cadmium, and subjecting the bodies to a temperature at which the water and halide will react to form an oxysalt and at which the carbon present on the ferrous bodies is transformed into carbon oxides and other impurities on the surface of the ferrous bodies are eliminated in a gaseous state, without oxidizing the ferrous bodies.

7. In a method of coating ferrous bodies with non-ferrous metals, the step of decarburizing and deoxidizing the surface of said ferrous bodies prior to the coating, which comprises coating said ferrous bodies with an aqueous solution of zinc chloride, and subjecting the bodies to a temperature at which the water and halide will react to form zinc oxychloride, and at which the carbon present on the ferrous bodies is transformed into carbon oxides, and other impurities on the surface of the ferrous bodies are eliminated in a gaseous state, without oxidizing the ferrous bodies.

8. In a method of coating ferrous bodies with non-ferrous metals, the step of decarburizing and deoxidizing the surface of said ferrous bodies prior to the coating, which comprises coating said ferrous bodies with an aqueous solution of cadmium chloride, and subjecting the bodies to a temperature at which the water and halide will react to form cadmium oxychlorhydrate, and at which the carbon present on the ferrous bodies is transformed into carbon oxides and other impurities on the surface of the ferrous bodies are eliminated in a gaseous state, without oxidizing the ferrous bodies.

ANSELMO ORTIZ RODRIGUEZ.